United States Patent [19]

Carroll et al.

[11] Patent Number: 5,166,871

[45] Date of Patent: Nov. 24, 1992

[54] BUCK SWITCHING REGULATOR WITH TOW CONTROL LOOPS

[75] Inventors: Lawrence B. Carroll, Endwell; Scott C. Willis, Endicott, both of N.Y.

[73] Assignee: International Business Machines Corporation, Armonk, N.Y.

[21] Appl. No.: 575,580

[22] Filed: Aug. 31, 1990

[51] Int. Cl.[5] .................... H02H 7/122; G05F 1/40
[52] U.S. Cl. .................................... 363/56; 361/18; 363/21; 323/284
[58] Field of Search .................... 363/86, 89, 56, 21; 323/282, 283, 284, 288; 361/18

[56] References Cited

U.S. PATENT DOCUMENTS

| | | | |
|---|---|---|---|
| 3,353,083 | 11/1967 | Greenberg et al. | 363/86 |
| 3,673,487 | 6/1972 | Hendrickson | 363/89 |
| 3,816,809 | 6/1974 | Kuster | 363/56 |
| 4,012,685 | 3/1977 | Nercessian | 307/53 |
| 4,025,862 | 5/1977 | Gautheron | 323/283 |
| 4,464,709 | 8/1984 | Barter | 363/16 |
| 4,594,541 | 6/1986 | Schott | 323/288 |
| 4,739,462 | 4/1988 | Farnsworth et al. | 363/21 |
| 4,739,466 | 4/1988 | Glennon et al. | 363/89 |
| 4,885,671 | 12/1989 | Peil | 363/17 |
| 4,937,697 | 6/1990 | Edwards et al. | 361/18 |
| 5,029,269 | 7/1991 | Elliot et al. | 363/21 |

FOREIGN PATENT DOCUMENTS 0157266 12/1981 Japan ............................ 323/285
1372301A 2/1988 U.S.S.R. .

OTHER PUBLICATIONS

IBM Technical Disclosure Bulletin, vol. 32, No. 5B, Oct., 1989.
IBM Technnical Disclosure Bulletin, vol. 32, No. 11, Apr. 1990.
Micro Linear Advance Information Sheet ML 4812, Jun., 1989.

Primary Examiner—Steven L. Stephen
Assistant Examiner—Ben M. Davidson
Attorney, Agent, or Firm—Pollock, Vande Sande & Priddy

[57] ABSTRACT

A buck switching regulated power supply having a first feedback loop which is relatively slow, so as to prevent rapid changes in the output current from being reflected to the input current. A second, faster feedback loop having a higher loop gain is provided, and is arranged to take over when the load voltage reaches a predetermined level, so as to prevent the load voltage from rising above such level.

5 Claims, 1 Drawing Sheet

BUCK SWITCHING REGULATOR WITH TOW CONTROL LOOPS

Technical Field

The present invention is directed to switching power supplies, and particularly to improved voltage regulating apparatus for such power supplies.

BACKGROUND OF THE INVENTION

For many applications, it is important to keep rapid changes in the load current which is provided by a regulated power supply from being reflected back to the input current. For example, such an application is when a three phase source is used to power single phase equipment. In such an arrangement, the output of the three phase source may be rectified, and then converted to single phase A.C. It is important in such an application to approximately equalize the phase currents at the input, so that a fuse or circuit breaker is not opened on one of the input lines when excessive current flows in it.

In order to prevent rapid changes in load current from being reflected to the input in a buck switching type regulator, the feedback loop may be arranged to be relatively slow. This arrangement will have the effect of spreading any reflection of load current changes into the input over several A.C. cycles. Thus, in the case where a three phase input is used, changes in the load current will be averaged over the three phases, rather than having a pronounced effect on any one phase.

However, when a relatively slow feedback loop is used, the voltage regulation at the load suffers to a certain extent.

While such a feedback loop provides adequate regulation under most operating conditions, if the load voltage should rise rapidly, the feedback loop may not follow fast enough to prevent damage to a circuit component.

It is to the solution of this problem which the present invention is directed.

SUMMARY OF THE INVENTION

It is thus an object of the invention to provide a power supply apparatus wherein rapid changes in the load current are not reflected in the input current.

It is a further object of the invention to limit the maximum value of the load voltage to a predetermined level.

In accordance with the invention, a switching power supply is provided wherein the input current is pulse width modulated by a modulator having a controllable duty cycle. The output of the modulator is filtered to eliminate the high frequency modulation component, and the output is applied to a load. A first feedback loop having a relatively long time constant and a relatively low gain is provided between the load voltage and an input of the pulse width modulator for controlling the duty cycle thereof. Additionally, a second feedback loop which has a shorter time constant and greater gain is provided, and is arranged to take over control when the output voltage attains a predetermined level. In accordance with the invention, the circuit is arranged so that the first feedback loop controls during normal operation with the effect that rapid changes in load current are not reflected to the input during such operation, while the second feedback loop controls when the output voltage exceeds a predetermined level, and is operative to limit the voltage to such level. Both feedback loops provide an analog control signal to the pulse width modulator for varying the pulse width.

The invention will be better understood by referring to the accompanying drawings, wherein:

DETAILED DESCRIPTION OF PREFERRED EMBODIMENT

Figure 1:
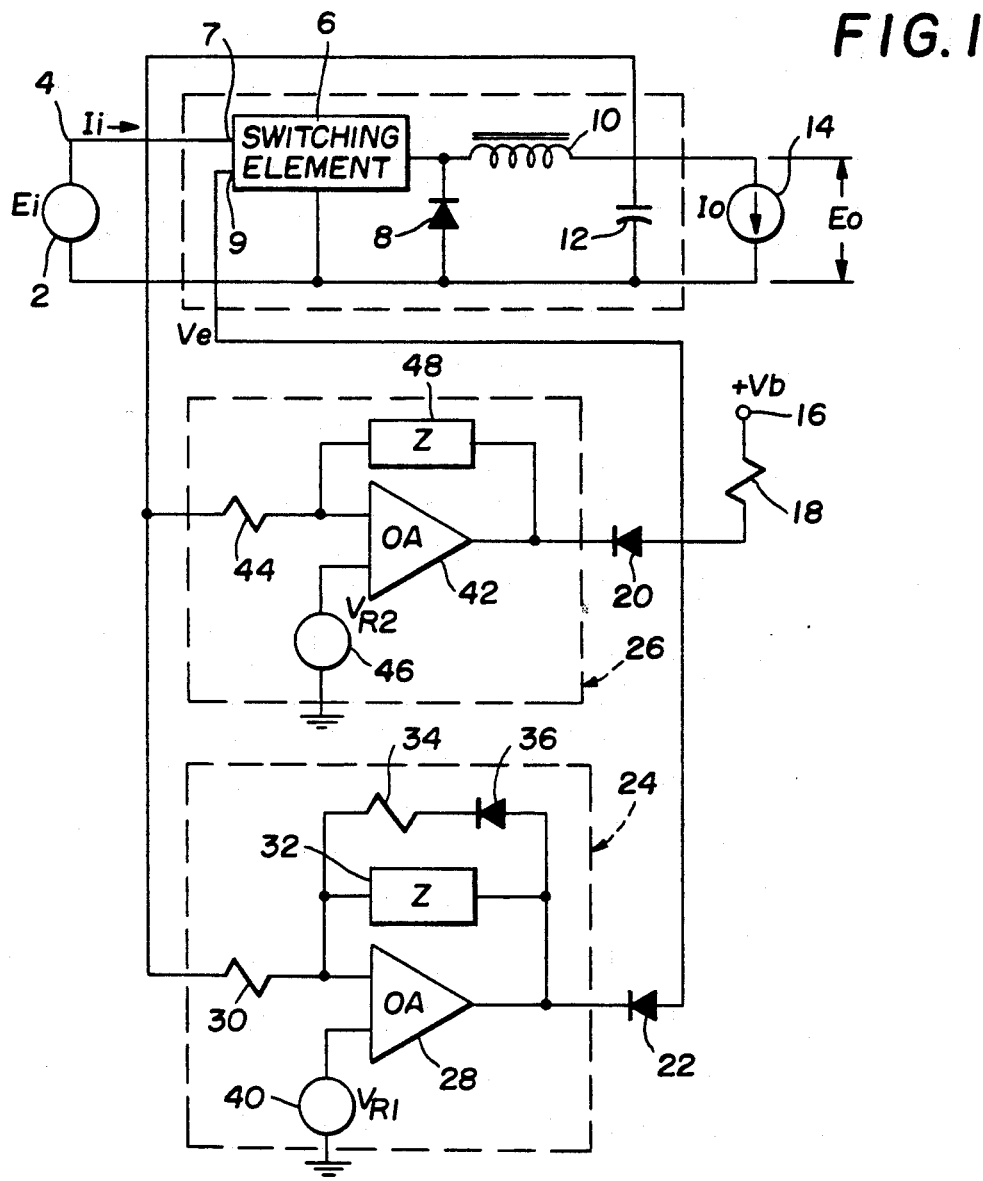
FIG. 1 is a circuit diagram of an embodiment of the invention.

Referring to FIG. 1, a D.C. voltage source 2 which provides input voltage Ei and input current Ii is shown. This current is fed to input 7 of switching element 6, which has a controllable duty cycle as determined by feedback voltage Ve, which is fed to input 9. Switching power supplies which include a feedback controlled pulse width modulator for introducing regulation are well known, and for example, such an arrangement is shown in detail, in U.S. Pat. No. 3,737,755.

The output of the pulse width modulator is fed to a low pass filter comprised of inductor 10 and capacitor 12, which removes the modulation frequency. Additionally, free wheeling diode 8 is provided, so as to maintain continuous current in inductor 10.

The circuit is loaded by current source 14, which is disposed across capacitor 12, and the load voltage Eo is fed to feedback loops 24 and 26, which determine the control voltage Ve which is fed to input 9 of pulse width modulator 6 to control the duty cycle thereof.

In accordance with the invention, feedback loop 24 controls under normal operating conditions, and this loop is arranged to have a relatively long time constant and a relatively low loop gain. The reason for this is to prevent rapid changes in the output current Io from being reflected into the input current Ii. Thus, with a relatively slow loop, a rapid change in Io will be averaged over several cycles of Ii. With such an arrangement, the capacitor 12 sources and sinks the changes in load current, and regulation of the load voltage is adequate under most operating conditions.

However, when the load voltage rises rapidly, the regulation which is provided by loop 24 may not be fast enough to prevent damage to circuit components, and it is thus necessary to prevent the load voltage from rising above a predetermined level. In accordance with the invention, this is accomplished by using a second feedback loop 26, which takes over control when the load voltage rises to the predetermined level. The second feedback loop has a faster response and higher loop gain then the first loop, and thus quickly regulates the load voltage, so as to prevent it from rising to above the predetermined level.

Referring to FIG. 1, feedback means 24 is comprised of operational amplifier 28, which has reference voltage source 40 providing voltage Vrl, and resistor 30 at respective inputs. Additionally, the operational amplifier has feedback components which include impedance 32, resistor 34, and diode 36.

Similarly, feedback means 26 is comprised of operational amplifier 42, which has voltage reference source 46 providing voltage Vr2, and resistor 44 at respective inputs. Operational amplifier 42 further has feedback impedance 48, and it should be noted that both operational amplifiers are fed by an OR gate which consists of voltage + Vb, resistor 18, and diodes 20 and 22. Finally, the reference voltage Vr2 is arranged to be higher than the reference voltage Vr1, and the time constant of impedance 48 is arranged to be shorter than that of impedance 32.

The operation of the circuit will now be described. As mentioned above, the error voltage Ve which is fed to input 9 of pulse width modulator 6 determines the degree of regulation which is provided. Ve is the amplified difference of the load voltage Eo and Vr1 or Vr2.

Because a low level of the OR gate shorts out a high level Ve will be determined by the loop with the lowest output. In this case, Vr1 is lower than Vr2, so Vr1 will control Eo if Io remains relatively constant. If Io should suddenly decrease, and the response of feedback means 24 is too slow to correct it, Eo will rise until it exceeds Vr2.

If the response of feedback means 26 is very fast, it will decrease Ve, and limit any further increase in Eo to Vr2. When the response of feedback means 24 catches up, it will further decrease Ve, returning Eo back to the value of Vr1. From this, it can be seen that Vr2 sets an upper limit on Eo and allows the change in Io to go into capacitor 12, preventing the input current Ii from rapidly following the reduction in the load current Io. If Io suddenly increases with feedback means 24 in control, Eo will drop since the slow response of feedback means 24 prevents it from following Eo. In this case, the increase in current is provided by capacitor 12, instead of increasing Ii. This approach therefore prevents rapid changes in the input current Ii when they occur in the load current Io, and puts a limit on the maximum value of the load voltage Eo. Diode 36 and resistor 34 decrease the time required for feedback means 24 to take over during bring up, by limiting the charge that can accumulate on the capacitors of impedance 32 from the bias supply (not shown) powering operational amplifier 28.

Figure 2:
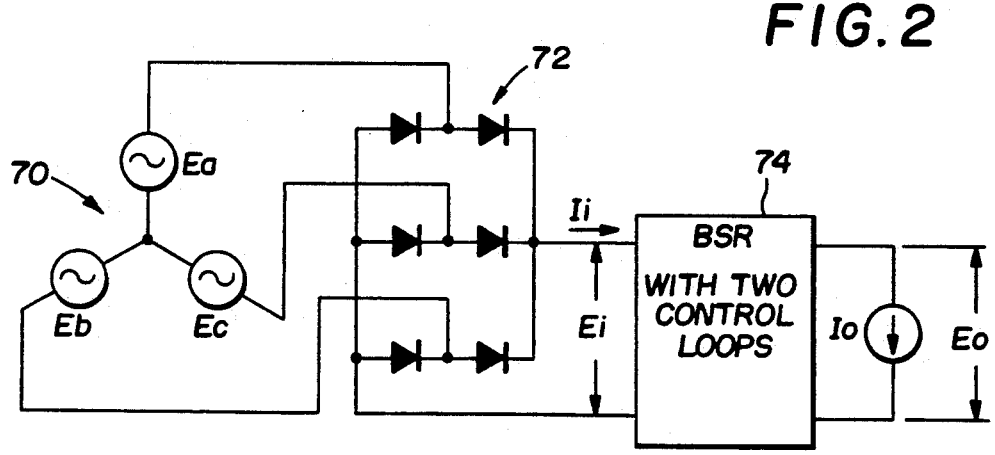
FIG. 2 shows the three phase arrangement which may be used as an input to the circuit of FIG. 1.

FIG. 2 shows a three phase source 70, which may comprise the input to the present circuitry. In this case, the three phase input would be rectified in three phase rectifier 72, and the resulting D.C. input current Ii would be fed to the buck switch regulator 74, which is shown in FIG. 1.

The circuitry is operative to maintain the three phase currents relatively even, while not allowing the load voltage to rise above a preselected level.

Thus, a regulated power supply in accordance with the invention has been described. It should be appreciated that while the invention has been disclosed in connection with illustrative embodiment, it is to be limited only by the claims appended hereto and equivalents.

We claim:

1. A voltage regulation apparatus wherein changes in load current are not rapidly reflected in the input current comprising,
   a power source for providing an input current,
   means having a controllable duty cycle for pulse width modulating the input current at a preselected frequency, filter means connected to the output of the means for pulse width modulating, which removes the preselected frequency,
   a load connected to the output of the filter means, a load voltage appearing thereacross,
   first feedback means responsive to the load voltage for controlling the duty cycle of the pulse width modulator so as to regulate the load voltage, said first feedback means having a relatively long time constant so that changes in the load current are not rapidly reflected in the input current, and
   second feedback means responsive to the load voltage rising above a predetermined level for providing an analog control signal to the pulse width modulator for varying the pulse width of the signal outputted thereby, said second feedback means having a relatively short time constant for more tightly regulating the load voltage in those instances where such voltage rises above said predetermined level.

2. The apparatus of claim 1 wherein said filter means includes a capacitor, which sources and sinks changes in the load current.

3. The apparatus of claim 2 wherein Each of said first and second feedback means includes operational amplifier means.

4. The apparatus of claim 3 wherein the operational amplifier means are connected to an OR gate which is comprised of two diodes, one side of each diode being connected to the output of a respective operational amplifier means, and the other side of each diode being connected to a constant voltage level.

5. The apparatus of claim 4 wherein a reference voltage is fed to an input of each operational amplifier means, and wherein the reference voltage which is fed to the operational amplifier means which is included in the first feedback means has a smaller value than the reference voltage which is fed to the operational amplifier means which is included in the second feedback means, and wherein the reference voltage which is fed to the operational amplifier in the second feedback means corresponds to said predetermined voltage level.

* * * * *

UNITED STATES PATENT AND TRADEMARK OFFICE
CERTIFICATE OF CORRECTION

PATENT NO. : 5,166,871

DATED : November 24, 1992

INVENTOR(S) : Carroll et al.

It is certified that error appears in the above-identified patent and that said Letters Patent is hereby corrected as shown below:

On title page, item [54] and col. 1, lines 1-2, should read as follows:

--BUCK SWITCHING REGULATOR WITH TWO CONTROL LOOPS--

Signed and Sealed this

Sixteenth Day of November, 1993

Attest:

BRUCE LEHMAN

Attesting Officer

Commissioner of Patents and Trademarks